United States Patent

Kielhorn-Bayer et al.

Patent Number: 5,859,146
Date of Patent: Jan. 12, 1999

[54] IMPACT-RESISTANT THERMOPLASTIC MOLDING MATERIALS

[75] Inventors: Sabine Kielhorn-Bayer, Maxdorf; Herbert Stutz, Karlsruhe; Dietrich Sänger, Frankenthal, all of Germany; Friedhelm Lehrich, Grosse Ile, Mich.; Peter Rieger, Mannheim, Germany

[73] Assignee: BASF Aktiengesellschaft, Ludwigshafen, Germany

[21] Appl. No.: 690,544

[22] Filed: Jul. 31, 1996

[30] Foreign Application Priority Data

Aug. 1, 1995 [DE] Germany ............... 195 28 191.8

[51] Int. Cl.$^6$ ............. C08L 59/00; C08L 59/02; C08L 59/04; C08L 75/04

[52] U.S. Cl. ............. 525/399; 525/123; 525/127; 525/128; 525/130; 525/410; 525/424; 525/440; 525/453; 525/454; 525/455; 525/460; 525/467

[58] Field of Search ............. 525/123, 127, 525/128, 130, 399, 410, 424, 440, 453, 454, 455, 460, 467

[56] References Cited

U.S. PATENT DOCUMENTS

| | | | |
|---|---|---|---|
| 4,080,356 | 3/1978 | Gergen et al. | 525/399 |
| 4,088,626 | 5/1978 | Gergen et al. | 524/505 |
| 4,088,627 | 5/1978 | Gergen et al. | 524/505 |
| 4,107,131 | 8/1978 | Gergen et al. | 525/130 |
| 4,111,894 | 9/1978 | Gergen et al. | 524/505 |
| 4,111,895 | 9/1978 | Gergen et al. | 524/505 |
| 4,119,607 | 10/1978 | Gergen et al. | 525/440 |
| 4,179,479 | 12/1979 | Carter, Jr. | 525/66 |
| 4,582,869 | 4/1986 | Waggoner | 524/227 |
| 4,585,819 | 4/1986 | Reischle et al. | 525/440 |
| 4,640,949 | 2/1987 | Wagman | 524/227 |
| 4,665,126 | 5/1987 | Kusumgar et al. | 525/66 |
| 4,713,414 | 12/1987 | Kusumgar | 525/64 |
| 4,748,195 | 5/1988 | Hackl et al. | 523/445 |
| 4,804,716 | 2/1989 | Flexman, Jr. | 525/399 |
| 4,845,161 | 7/1989 | Richardson | 525/399 |
| 4,946,906 | 8/1990 | Yano et al. | 525/399 |
| 5,055,525 | 10/1991 | Henton et al. | 525/66 |
| 5,145,909 | 9/1992 | Takida et al. | 525/57 |
| 5,183,860 | 2/1993 | Kashihara | 525/398 |
| 5,237,000 | 8/1993 | Lausberg et al. | 525/64 |
| 5,286,807 | 2/1994 | Flexman, Jr. | 525/399 |
| 5,310,822 | 5/1994 | Kielhorn-Bayer et al. | 525/399 |
| 5,318,813 | 6/1994 | Flexman, Jr. | 428/36.9 |
| 5,326,846 | 7/1994 | Nagai et al. | 528/44 |
| 5,331,044 | 7/1994 | Lausberg et al. | 524/871 |
| 5,344,882 | 9/1994 | Flexman | 525/131 |
| 5,436,295 | 7/1995 | Nishikawa et al. | 525/127 |
| 5,519,094 | 5/1996 | Tseng et al. | 525/440 |
| 5,530,061 | 6/1996 | Sanada et al. | 525/52 |
| 5,585,152 | 12/1996 | Tamura et al. | 525/424 |
| 5,641,830 | 6/1997 | Nun et al. | 524/542 |
| 5,693,709 | 12/1997 | Nun et al. | 524/593 |
| 5,700,881 | 12/1997 | Wagner et al. | 525/440 |

FOREIGN PATENT DOCUMENTS

| | | |
|---|---|---|
| 882 117 | 7/1980 | Belgium . |
| 116 456 | 8/1984 | European Pat. Off. . |
| 117 664 | 9/1984 | European Pat. Off. . |
| 120 711 | 10/1984 | European Pat. Off. . |
| 121 407 | 10/1984 | European Pat. Off. . |
| 290 761 | 11/1988 | European Pat. Off. . |
| 350 223 | 1/1990 | European Pat. Off. . |
| 409 464 | 1/1991 | European Pat. Off. . |

OTHER PUBLICATIONS

Derwent Abst. JP 58. 2 095 27.
Chem. Abst. J 57 085 994.
Chem. Abst. J 56 136 838.
Chem. Abst. J 63 126 709.

*Primary Examiner*—Rabon Sergent
*Attorney, Agent, or Firm*—Keil & Weinkauf

[57] ABSTRACT

Thermoplastic molding materials contain

A) from 10 to 99.5% by weight of a thermoplastic polymer selected from the group consisting of the polyoxymethylenes, polyolefins, polyesters, polycarbonates, polystyrene, ABS, ASA, SAN, polyamides or poly(meth)acrylates or mixtures thereof, B) from 0.5 to 80% by weight of a thermoplastic polyurethane having a melting point of <200° C., C) from 0 to 50% by weight of a fibrous or particulate filler or a mixture thereof and D) from 0 to 30% by weight of conventional additives and processing assistants, the percentages by weight of the components A) to D) summing to 100%.

2 Claims, No Drawings

IMPACT-RESISTANT THERMOPLASTIC MOLDING MATERIALS

The present invention relates to thermoplastic molding materials containing

A) from 10 to 99.5% by weight of a thermoplastic polymer selected from the group consisting of the polyoxymethylenes, polyolefins, polyesters, polycarbonates, polystyrene, ABS, ASA, SAN, polyamides or poly(meth)acrylates or mixtures thereof, B) from 0.5 to 80% by weight of a thermoplastic polyurethane having a melting point of <200° C., C) from 0 to 50% by weight of a fibrous or particulate filler or a mixture thereof and D) from 0 to 30% by weight of conventional additives and processing assistants, the percentages by weight of the components A) to D) summing to 100%.

The present invention furthermore relates to the use of such molding materials for the production of moldings of any kind and to the moldings obtainable therefrom.

Polyoxymethylenes which contain thermoplastic polyurethanes as impact modifiers are disclosed in EP-A 116 456, EP-A 121 407, EP-A 120 711 and EP-A 117 664.

The blending of thermoplastic polyurethanes with other polymers is disclosed in:

JP-A 56/1 368 38 blends of polyester and polyurethane

JP-A 58/2 095 27 reinforced thermoplastic molding materials comprising two different thermoplastics and filler (eg. polyurethane+polystyrene or ABS+glass beads)

JP-A 57/0 859 94 thermoplastic molding materials (eg. polyamide) with polyurethane, carbon black and metal sulfide powder BE-A 882 117 thermoplastic molding materials comprising TPU and modified PE and further thermoplastics, such as polyester JP-A 63/1 267 09 molding materials consisting of noncrystalline thermoplastics.(eg. polyamide, PET, polyolefin or polyurethane) and crystalline thermoplastics (eg. polystyrene, PVC or ABS).

In the known TPU-containing polymer blends, the formation of coatings on the mold during processing is worthy of improvement.

In the preparation of TPU, which constitute segmented block copolymers, the block structure can be influenced by varying the synthesis conditions when leaving the ratios of the starting components unchanged. In a one-shot reaction, the resulting hard segments and the polyurethane prepolymer separate so that a more or less phase-segregated system is formed depending on the temperature. An increase in the reaction temperature results in better solubility of the hard segment in the reaction mixture, ie. a reduction of phase separation. As a result of the substantially single-phase reaction at elevated temperatures, the interphase adhesion is more advanced than in the opposite case.

Since the polyurethane formation is thermally reversible—a reaction which occurs mainly in the case of multiple extrusion—the hard segments responsible for the crystallinity dissociate (even below the melting point) and form oligomers which are deposited, for example, on the cool inner surface of a mold.

It is an object of the present invention to provide thermoplastic molding materials which exhibit very little formation of coatings on the mold during processing.

We have found that this object is achieved by the molding materials defined at the outset.

Preferred molding materials of this type are described in subclaims.

The novel molding materials contain, as component A), from 10 to 99.5, preferably from 15 to 99, in particular from 20 to 95, % by weight of a thermoplastic polymer selected from the group consisting of the polyoxymethylenes, polyolefins, polyesters, polycarbonates, polystyrene, ABS, SAN, ASA, poly(meth)acrylates or polyamides or mixtures thereof.

In general, polyesters A based on aromatic dicarboxylic acids and an aliphatic or aromatic dihydroxy compound are used.

A first group of preferred polyesters comprises polyalkylene terephthalates having 2 to 10 carbon atoms in the alcohol moiety.

Such polyalkylene terephthalates are known per se and are described in the literature. They contain an aromatic ring in the main chain, which ring originates from the aromatic dicarboxylic acid. The aromatic ring may also be substituted, for example by halogen, such as chlorine or bromine, or by $C_1$–$C_4$-alkyl, such as methyl, ethyl, isopropyl, n-propyl, n-butyl, isobutyl or tert-butyl.

These polyalkylene terephthalates may be prepared by reacting aromatic dicarboxylic acids, their esters or other ester-forming derivatives with aliphatic dihydroxy compounds in a manner known per se.

Examples of preferred dicarboxylic acids are naphthalene-dicarboxylic acid, terephthalic acid and isophthalic acid and mixtures thereof. Up to 30, preferably not more than 10, mol % of the aromatic dicarboxylic acids may be replaced by aliphatic or cycloaliphatic dicarboxylic acids, such as adipic acid, azelaic acid, sebacic acid, dodecanedioic acids and cyclohexanedicarboxylic acids.

From the aliphatic dihydroxy compounds, diols of 2 to 6 carbon atoms, in particular 1,2-ethanediol, 1,4-butanediol, 1,6-hexanediol, 1,4-hexanediol, 1,4-cyclohexanediol and neopentylglycol or mixtures thereof are preferred.

Examples of particularly preferred polyesters (A) are polyalkylene terephthalates which are derived from alkanediols of 2 to 6 carbon atoms. Among these, polyethylene terephthalate and polybutylene terephthalate are particularly preferred.

The relative viscosity of the polyesters (A) is in general from 1.2 to 1.8 (measured in a 0.5% by weight solution in a phenol/o-dichlorobenzene mixture (weight ratio 1:1) at 25° C.).

A further group comprises wholly aromatic polyesters which are derived from aromatic dicarboxylic acids and aromatic dihydroxy compounds.

Suitable aromatic dicarboxylic acids are the compounds described above in the case of the polyalkylene terephthalates. Mixtures of from 5 to 100 mol % of isophthalic acid and from 0 to 95 mol % of terephthalic acid, in particular roughly equivalent mixtures of these two acids, are preferred.

The aromatic dihydroxy compounds are preferably of the general formula III

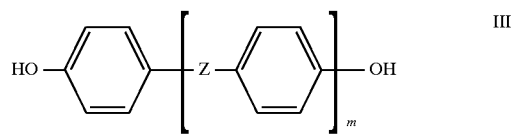

where Z is an alkylene or cycloalkylene group with up to 8 carbon atoms, arylene of up to 12 carbon atoms, carbonyl, sulfonyl, oxygen or sulfur or a chemical bond and m is 0 or 1. The compounds may furthermore carry $C_1$–$C_6$-alkyl, fluorine, chlorine or bromine as substituents on the phenylene groups.

Examples of parent structures of these compounds are
dihydroxybiphenyl,
di(hydroxyphenyl)alkane,
di(hydroxyphenyl)cycloalkane,
di(hydroxyphenyl)sulfide,
di(hydroxyphenyl)ether,
di(hydroxyphenyl)ketone,
di(hydroxyphenyl)sulfoxide,
α,α'-di(hydroxyphenyl)dialkylbenzene,
resorcinol and
hydroquinone and their derivatives alkylated on the nucleus or
halogenated on the nucleus.
Among these,
4,4'-dihydroxybiphenyl,
2,4-di(4'-hydroxyphenyl)-2-methylbutane,
α,α'-di(4-hydroxyphenyl)-p-diisopropylbenzene,
2,2-di(3'-methyl-4'-hydroxyphenyl)propane and
2,2-di(3'-chloro-4'-hydroxyphenyl)propane,
and in particular
2,2-di(4'-hydroxyphenyl)propane
2,2-di(3',5'-dichlorodihydroxyphenyl)propane,
1,1-di(4'-hydroxyphenyl)cyclohexane and
2,2-di(3',5'-dimethyl-4'-hydroxyphenyl)propane and mixtures thereof
are preferred.

It is of course also possible to use mixtures of polyalkylene terephthalates and wholly aromatic polyesters. These contain in general from 20 to 98% by weight of the polyalkylene terephthalates and from 2 to 80% by weight of the wholly aromatic polyesters.

For the purposes of the present invention, polyesters are also to be understood as meaning polycarbonates which are obtainable by polymerizing aromatic dihydroxy compounds, in particular 2,2-bis(4-hydroxyphenyl)propane (bisphenol A) or derivatives thereof, for example with phosgene. Corresponding products are known per se and are described in the literature and for the most part are also commercially available.

Polystyrenes may be mentioned as further components A).

Both homopolymers and copolymers of vinylaromatic monomers of 8 to 12 carbon atoms are suitable.

Styrene is particularly suitable, as well as the styrenes alkylated on the nucleus or on the side chain. Examples are chlorostyrene, α-methylstyrene, styrene, p-methylstyrene, vinyltoluene and p-tert-butylstyrene. However, styrene alone is preferably used.

The homopolymers are generally prepared by the known mass, solution or suspension methods (cf. Ullmanns Enzyklopädie der techn. Chemie, Volume 19, pages 265 to 272, Verlag Chemie, Weinheim 1980). The homopolymers may have a weight average molecular weight $M_w$ of from 100 to 300,000, which can be determined by conventional methods.

Examples of suitable comonomers for the preparation of copolymers are (meth)acrylic acid, alkyl(meth)acrylates where the alkyl radical is of 1 to 4 carbon atoms, acrylonitrile and maleic anhydride, as well as maleimides, acrylamide and methacrylamides and N,N- or N-alkyl-substituted derivatives where the alkyl radical is of 1 to 10 carbon atoms.

Depending on their chemical structure, comonomers are contained in the styrene polymers in different amounts. The miscibility of the copolymer with the polyphenylene ether is critical with regard to the content of comonomers in the copolymer. Such miscibility limits are known and are described, for example, in U.S. Pat. Nos. 4,360,618 and 4,405,753 and in the publication by J. R. Fried and G. A. Hanna, Polymer Eng. Sci. 22 (1982), 705 et seq. The preparation of the copolymers is carried out by known processes, which are described, for example, in Ullmanns Enzyklopädie der techn. Chemie, Volume 19, page 273 et seq., Verlag Chemie, Weinheim (1980). The copolymers generally have a weight average molecular weight ($M_w$) of from 10,000 to 300,000, which can be determined by conventional methods.

The component A) is preferably high-impact polystyrene whose rubber content is generally from 3 to 20, preferably from 4 to 15, % by weight.

The most often used processes for the preparation of toughened styrene polymers comprise mass or solution polymerization in the presence of a rubber, as described, for example, in U.S. Pat. No. 2,694,692, and mass-suspension polymerization processes, as described, for example, in U.S. Pat. No. 2,862,906. Other processes can of course also be used, provided that the desired particle size of the rubber phase is established.

The rubbers used are the natural or synthetic rubbers usually used for toughening styrene polymers. For the purposes of the present invention, suitable rubbers in addition to natural rubber are, for example, polybutadiene, polyisoprene and copolymers of butadiene and/or isoprene with styrene and other comonomers, which have a glass transition temperature of less than −20° C., determined according to K. H. Illers and H. Breuer, Kolloidzeitschrift 190 (1) (1963), 16–34.

Mixtures of toughened and untoughened vinyl aromatic polymers may also be used, any desired mixing ratio being possible.

Further polymers A) are ABS, ASA and SAN polymers. The preparation and composition are familiar to a person skilled in the art. Such products are commercially available.

The novel molding materials may contain polyethylene or polypropylene as component A).

A preferred component A) is polyethylene having a high density of from 0.94 to 0.98, preferably from 0.95 to 0.96, and in particular from 0.951 to 0.958, g/cm³.

The melt flow index MFI is in general less than 5, preferably less than 3, g/10 min at 190° C. and a load of 21.6 kg (determined according to DIN 53 735).

The melt flow index corresponds to the amount of polymer which is formed within 10 minutes, at 190° C. and under a weight of 21.6 kg, out of the test apparatus standardized according to DIN 53 735.

Such polyolefins are usually prepared by low-pressure polymerization using metal-containing catalysts, for example with the aid of titanium- and aluminum-containing Ziegler catalysts or, in the case of polyethylene, also by means of Phillips catalysts based on chromium-containing compounds. The polymerization reaction can be carried out in the gas phase, in solution or in suspension, using the reactors usually employed in industry. In the preparation of the novel polymer blend, the polyethylene or polypropylene may be used in the form of both coarse particles and granules. Mixtures of polyethylene and polypropylene may also be used, any desired mixing ratio being possible.

Particularly preferred components A) are polyoxymethylene homopolymers or copolymers.

Such polymers are known per se to a person skilled in the art and are described in the literature.

Very generally, these polymers contain at least 50 mol % of repeating units —CH$_2$O— in the polymer main chain.

The homopolymers are generally prepared by polymerizing formaldehyde or trioxane, preferably in the presence of suitable catalysts.

For the purposes of the present invention, preferred components A) are polyoxymethylene copolymers, in particular those which, in addition to the repeating units —CH$_2$O—, also contain up to 50, preferably from 0.1 to 20, in particular from 0.3 to 10, mol % of repeating units

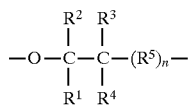

where R$^1$ to R$^4$, independently of one another, are each hydrogen, C$_1$–C$_4$-alkyl or halogen-substituted alkyl of 1 to 4 carbon atoms, R5 is —CH$_2$—, —CH$_2$O—, methylene substituted by C$_1$–C$_4$-alkyl or by C$_1$–C$_4$-haloalkyl, or a corresponding oxymethylene group, and n is from 0 to 3. Advantageously, these groups can be introduced into the copolymers by ring cleavage of cyclic ethers. Preferred cyclic ethers are those of the formula

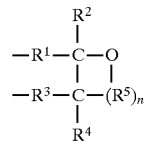

where R$^1$ to R$^5$ and n have the abovementioned meanings. Merely by way of example, ethylene oxide, 1,2-propylene oxide, 1,2-butylene oxide, 1,3-butylene oxide, 1,3-dioxane, 1,3-dioxolane and 1,3-dioxepan may be mentioned as cyclic ethers, and linear oligo- and polyformals, such as polydioxolane or polydioxepan, as comonomers.

Other suitable components A) are oxymethylene terpolymers, which are prepared, for example, by reacting trioxane and one of the cyclic ethers described above with a third monomer, preferably a bifunctional compound of the formula

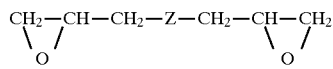

where Z is a chemical bond, —O—, —ORO— (R=C$_1$–C$_8$-alkylene or C$_2$–C$_8$-cycloalkylene).

Preferred monomers of this type are ethylenediglycide, diglycidyl ether and diethers of glycidyl compounds and formaldehyde, dioxane or trioxane in the molar ratio of 2:1, and diethers of 2 mol of the glycidyl compound and 1 mol of an aliphatic diol of 2 to 8 carbon atoms, for example the diglycidyl ethers of ethylene glycol, 1,4-butanediol, 1,3-butanediol, cyclobutane-1,3-diol, 1,2-propanediol and cyclohexane-1,4-diol, to mention but a few examples.

Processes for the preparation of the homo- and copolymers described above are known to a person skilled in the art and are described in the literature, so that further information is unnecessary here.

The preferred polyoxymethylene copolymers have melting points of at least 150° C. and weight average molecular weights M$_w$ of from 5000 to 200,000, preferably from 7000 to 150,000.

Polyoxymethylene polymers which have stabilized terminal groups and which possess C—C bonds at their chain ends are particularly preferred.

Suitable monomers for poly(meth)acrylates A) are C$_1$–C$_{18}$-alkyl esters of methacrylic acid or acrylic acid or mixtures thereof.

According to the invention, the C$_1$–C$_{18}$-alkyl esters, such as methyl, ethyl, n-propyl, isopropyl, n-butyl, isobutyl, sec-butyl, tert-butyl, pentyl, hexyl, heptyl, octyl, 2-ethylhexyl, nonyl, decyl, lauryl or stearyl acrylate, preferably methyl acrylate, n-butyl acrylate and 2-ethylhexyl acrylate, and mixtures of these monomers are used as esters of acrylic acid.

According to the invention, the C$_1$–C$_{18}$-alkyl esters, such as methyl, ethyl, n-propyl, isopropyl, n-butyl, isobutyl, sec-butyl, tert-butyl, pentyl, hexyl, heptyl, octyl, 2-ethylhexyl, nonyl, decyl, lauryl or stearyl methacrylate, preferably methyl methacrylate, and mixtures of these monomers are used as esters of methacrylic acid.

Very generally, polyamides A) having an aliphatic semi-crystalline or partly aromatic and amorphous structure of any type and blends thereof are preferred. Corresponding products are available under the trade name Ultramid® from BASF AG.

The novel molding materials contain, as component B), from 0.5 to 80, preferably from 1 to 60, in particular from 5 to 50, % by weight of a thermoplastic polyurethane (TPU) having a melting point of <200° C., preferably <195° C., in particular <185° C., very particularly preferably <180° C.

Suitable TPUs can be prepared, for example, by reacting
a) organic, preferably aromatic, diisocyanates,
b) polyhydroxy compounds having molecular weights of from 500 to 8000 and
c) chain extenders having molecular weights of from 60 to 400 in the presence or absence of
d) catalysts,
e) assistants and/or additives.

The following may be stated in connection with the starting materials (a) to (c), catalysts (d) and assistants and additives (e) which may be used for this purpose:

a) examples of suitable organic diisocyanates (a) are aliphatic, cycloaliphatic and, preferably, aromatic diisocyanates. Specific examples are aliphatic diisocyanates, such as hexamethylene diisocyanate, cycloaliphatic diisocyanates, such as isophorone diisocyanate, cyclohexane 1,4-diisocyanate, 1-methylcyclohexane 2,4- and 2,6-diisocyanate, and the corresponding isomer mixtures, dicyclohexylmethane 4,4'-, 2,4'- and 2,2'-diisocyanate and the corresponding isomer mixtures and preferably aromatic diisocyanates, such as toluylene 2,4-diisocyanate, mixtures of toluylene 2,4- and 2,6-diisocyanate, diphenylmethane 4,4', 2,4'- and 2,2'-diisocyanate, mixtures of diphenylmethane 2,4'- and 4,4'-diisocyanate, urethane-modified liquid diphenylmethane 4,4'- and/or 2,4'-diisocyanates, 1,2-(4, 4'-diisocyanatodiphenyl)ethane and naphthylene 1,5-diisocyanate. Hexamethylene diisocyanate, isophorone diisocyanate, naphthylene 1,5-diisocyanate, diphenylmethane diisocyanate isomer mixtures having a diphenylmethane 4,4'-diisocyanate content of more than 96% by weight and in particular diphenylmethane 4,4'-diisocyanate are preferably used.

b) Preferred relatively high molecular weight polyhydroxy compounds (b) having molecular weights of from 500 to 8000 are polyetherols and polyesterols. However, hydroxyl-containing polymers, for example polyacetals, such as polyoxymethylenes, and especially water-insoluble formals, for example polybutanediol formal and polyhexanediol formal, and polycarbonates, in particular those based on diphenyl carbonate and 1,6-hexanediol, prepared by transesterification and having the abovementioned molecular weights, are also suitable. The polyhydroxy compounds must be at least predominantly linear, ie. must be difunctional for the purposes of the isocyanate reaction. The stated polyhydroxy compounds may be used as individual components or in the form of mixtures.

Suitable polyetherols can be prepared by reacting one or more alkylene oxides where the alkylene radical is of 2 to 4 carbon atoms with an initiator molecule which contains two bonded active hydrogen atoms. Examples of alkylene oxides are ethylene oxide, 1,2-propylene oxide, and 1,2- and 2,3-butylene oxide. Ethylene oxide and mixtures of 1,2-propylene oxide and ethylene oxide are preferably used. The alkylene oxides may be used individually, alternately in succession or as a mixture. Examples of suitable initiator molecules are water, amino alcohols, such as N-alkyldiethanolamines, for example N-methyldiethanolamine, and diols, such as ethylene glycol, 1,3-propylene glycol, 1,4-butanediol and 1,6-hexanediol. If necessary, mixtures of initiator molecules may also be used. Other suitable polyetherols are the hydroxyl-containing polymerization products of tetrahydrofuran (polyoxytetramethylene glycols).

Preferred polyetherols are those obtained from 1,2-propylene oxide and ethylene oxide, in which more than 50%, preferably from 60 to 80%, of the OH groups are primary hydroxyl groups and in which at least some of the ethylene oxide is arranged as a terminal block, in particular polyoxytetramethylene glycols.

Such polyetherols can be obtained by polymerizing first 1,2-propylene oxide and then ethylene oxide with the initiator molecule, or first copolymerizing the total amount of 1,2-propylene oxide as a mixture with some of the ethylene oxide and then polymerizing on the remainder of the ethylene oxide, or polymerizing first some of the ethylene oxide, and then the total amount of 1,2-propylene oxide and then the remainder of the ethylene oxide with the initiator molecular in a stepwise procedure.

The essentially linear polyetherols have molecular weights of from 500 to 8000, preferably from 600 to 6000, in particular from 800 to 3500. They can be used both individually and in the form of mixtures with one another.

Suitable polyesterols can be prepared, for example, from dicarboxylic acids of 2 to 12, preferably 4 to 8, carbon atoms and polyhydric alcohols. Examples of suitable dicarboxylic acids are aliphatic dicarboxylic acids, such as succinic acid, glutaric acid, adipic acid, suberic acid, azelaic acid and sebacic acid, and aromatic dicarboxylic acids, such as phthalic acid, isophthalic acid and terephthalic acid. The dicarboxylic acids may be used individually or as mixtures, for example in the form of mixtures of succinic, glutaric and adipic acid. Mixtures of aromatic and aliphatic dicarboxylic acids may also be used. For the preparation of the polyesterols, it may be advantageous to use, instead of the dicarboxylic acids, the corresponding dicarboxylic acid derivatives, such as dicarboxylic esters where the alcohol radical is of 1 to 4 carbon atoms, dicarboxylic anhydrides or dicarbonyl chlorides. Examples of polyhydric alcohols are glycols of 2 to 10, preferably 2 to 6, carbon atoms, such as ethylene glycol diethylene glycol, 1,4-butanediol, 1,5-pentanediol, 1,6-hexanediol, 1,10-decanediol, 2,2-dimethyl-1,3-propanediol, 1,3-propanediol and dipropylene glycol. Depending on the desired properties, the polyhydric alcohols may be used alone or, if required, as mixtures with one another.

Esters of carbonic acid with the stated diols, in particular those of 4 to 6 carbon atoms, such as 1,4-butanediol and/or 1,6-hexanediol, condensates of ω-hydroxycarboxylic acids, for example ω-hydroxycaproic acid, and preferably polymerization products of lactones, for example unsubstituted or substituted ω-caprolactones, are also suitable.

Preferably used polyesterols are dialkylene glycol polyadipates where the alkylene radical is of 2 to 6 carbon atoms, eg. ethanediol polyadipates, 1,4-butanediol polyadipates, ethanediol butanediol 1,4-polyadipates, 1,6-hexanediol neopentylglycol polyadipates, polycaprolactones and in particular 1,6-hexanediol 1,4-butanediol polyadipates.

Polyesterols have molecular weights of from 500 to 6000, preferably from 800 to 3500.

c) Preferred chain extenders (c) having molecular weights of from 60 to 400, preferably from 60 to 300, are aliphatic diols of 2 to 12, preferably 2, 4 or 6, carbon atoms, eg. ethanediol, 1,6-hexanediol, diethylene glycol, dipropylene glycol and in particlar 1,4-butanediol. However, diesters of terephthalic acid with glycols of 2 to 4 carbon atoms are also suitable, eg. bis(ethylene glycol)terephthalate or bis(1,4-butanediol)terephthalate, hydroxyalkylene ethers of hydroquinone, eg. 1,4-di(β-hydroxyethyl)hydroquinone, (cyclo)aliphatic diamines, eg. 4,4'-diaminodicyclohexylmethane, 3,3'-dimethyl-4,4,'-diaminodicyclohexylmethane, isophoronediamine, ethylenediamine, 1,2- and 1,3-propylenediamine, N-methyl-1,3-propylenediamine and N,N'-dimethylethylenediamine, and aromatic diamines, eg. 2,4- and 2,6-toluylenediamine, 3,5-diethyl-2,4- and -2,6-toluylenediamine and primary ortho-dialkyl-, trialkyl- and/or tetraalkyl-substituted 4,4,'-diaminodiphenylmethanes.

In order to establish the hardness and melting point of the TPU, the components (b) and (c) can be varied within relatively wide molar ratios. Molar ratios of polyhydroxy compounds (b) to chain extenders (c) are from 1:1 to 1:12, in particular from 1:1.8 to 1:6.4, have proven particularly useful, the hardness and the melting point of the TPU increasing with increasing content of diols.

For the preparation of the TPU, the components (a), (b) and (c) are reacted in the presence or absence of catalysts (d) and assistants and/or additives (e) in amounts such that the ratio of the number of equivalents of NCO groups of the diisocyanates (a) to the total number of equivalents of hydroxyl groups or hydroxyl and amino groups of components (b) and (c) is from 1:0.85 to 1:1.20, preferably from 1:0.95 to 1:1.05, in particular from 1.098 to 1:1.02.

Suitable catalysts which in particular accelerate the reaction between the NCO groups of the diisocyanates (a) and the hydroxyl groups of the components (b) and (c) are the conventional prior art tertiary amines, eg. triethylamine, dimethylcyclohexylamine, N-methylmorpholine, N,N'-dimethylpiperazine, 2-(dimethylaminoethoxy)ethanol, diazabicyclo[2.2.2]octane and the like, and in particular organic metal compounds, such as esters of titanic acid, iron compounds, such as iron(III) acetylacetonate, tin compounds, eg. tin diacetate, tin dioctoate, tin dilaurate or the dialkyltin salts of aliphatic carboxylic acids, such as dibutyltin diacetate, dibutyltin dilaurate or the like. The catalysts are usually used in amounts from 0.001 to 0.1 part per 100 parts of polyhydroxy compound (b).

In addition to catalysts, assistants and/or additives (e) may also be incorporated into the components (a) to (c). Examples are lubricants, inhibitors, stabilizers against hydrolysis, light, heat or discoloration, dyes, pigments, inorganic and/or organic fillers and plasticizers.

Further information about the abovementioned assistants and additives appears in the technical literature, for example the monograph by J. H. Saunders and K. C. Frisch High Polymers, Volume XVI, Polyurethane, Parts 1 and 2, Interscience Publishers 1962 or 1964, German Laid-Open Application DOS 2,901,774.

The polyurethane elastomers which can be processed by a thermoplastic method are prepared by known processes, continuously or batchwise, both by the economical one-shot method in which all reactants are mixed with one another in succession or simultaneously and by the prepolymer method in which the prepolymer having terminal NCO groups is first prepared from the relatively high molecular weight polyesterpolyols and the organic diisocyanates and is then further reacted with the chain extenders and crosslinking agents. The reaction is carried out by rapid and thorough mixing of the reactants in amounts such that the ratio of NCO groups of the diisocyanates to the total number of all hydrogen atoms of components (b), (c) and (d), preferably OH groups, which react with NCO groups is from 1:0.9 to 1:1.2, preferably from 1:0.95 to 1:1.10, in particular about 1:1. Since the reaction is exothermic and takes place rapidly, it is generally complete after a few minutes.

The polyurethane elastomer obtained can then be thermally aftertreated (matured), granulated and further processed. It is also possible to introduce the reaction mixture into the feed zone of an extruder, the reaction being complete in a short time and it being possible to remove the prepared polyurethane elastomer at the extruder outlet and to further process it.

To enable melting points of the TPUs of less than 200° C. to be achieved, it is advisable to carry out the reaction within the temperature ranges below.

The initial temperature of the reaction mixture is preferably ≧100° C., particularly preferably from 100 to 130° C., and in particular from 100° C. to 120° C.

In particular, the pouring temperatures in the preferred one-shot method when pouring the reaction mixture onto the belt or a preheated plate should be from 140° to 200° C., preferably from 140° to 190° C., in particular from 140° to 170° C.

The thermal maturing is carried out in general at from 60° to 120° C., preferably from 80° to 120° C., in particular from 80° to 100° C., over a period of from 2 to 48, preferably from 6 to 30, in particular from 10 to 25, hours.

The melting point of the TPU component is usually determined by differential scanning calorimetry (DSC) over a temperature range from −100° to 250° C. and at a heating rate of 20° C./min under inert gas conditions.

The novel molding materials may contain, as component C), from 0 to 50, preferably up to 40, % by weight of a fibrous or particulate filler or a mixture thereof.

Examples of reinforcing fillers are potassium titanate whiskers, carbon fibers and preferably glass fibers, and the glass fibers may be used, for example, in the form of woven glass fabrics, glass matts, glass surface matts and/or glass rovings or chopped glass filaments of low-alkali E-glass having a diameter of from 5 to 200 μm, preferably from 8 to 50 μm, the fibrous fillers preferably having an average length from 0.05 to 1 mm, in particular from 0.1 to 0.5 mm, after they have been incorporated.

Other suitable fillers are, for example, wollastonite, calcium carbonate, glass beads, quartz powder, silicon nitride and boron nitride or mixtures of these fillers.

In addition to the components A) and B) and, if required, C), the novel molding materials may also contain conventional additives and processing assistants D) in amounts of up to 30, preferably up to 20, % by weight. Formaldehyde scavengers, plasticizers, lubricants, antioxidants, adhesion promoters, light stabilizers and pigments may be mentioned here merely by way of example. The amount of such additives is in general from 0.001 to 5% by weight.

According to a preferred embodiment, the novel molding materials may contain a maleic acid/formaldehyde condensate as a nucleating agent. Suitable products are described, for example, in DE 25 40 207.

Corresponding compounds are known to a person skilled in the art and are described, for example, in EP-A 327 384.

The novel thermoplastic molding materials are prepared by mixing the components in a manner known per se, and detailed information is therefore unnecessary. The components are advantageously mixed in an extruder.

The novel thermoplastic molding materials have a balanced property spectrum, in particular form very little coating on the mold during processing.

Accordingly, they are suitable for the production of moldings of all types, applications in which high toughness is required (for example in the transport sector) being preferred.

EXAMPLES

1. Preparation of the thermoplastic polyurethanes (component B)

Composition, in % by weight, of the components B/1 to B/6V used 41.4% by weight of adipic acid 24.1% by weight of methylenediphenyl 4,4'-diisocyanate 33.8% by weight of butane-1,4-diol 0.7% by weight of bis(2,6-diisopropylphenyl) carbodiimide Component B/1

1000 g (0.435 mol) of a polyesterpolyol, prepared from 694 g (4.752 mol) of adipic acid and 467 g (5.184 mol) of butanediol and having an OH number of 56, corresponding to a number average molecular weight of 2300, were dehydrated at 100° C. and 20 mbar for 30 minutes, and 105 g (1209 mol) of butane-1,4-diol and 11 g (0.031 mol) of bis(2,6-diisopropylphenyl)carbodiimide were added while stirring. 425 g (1.698 mol) of methylenediphenyl 4,4'-diisocyanate heated to 50° C. were then stirred into the mixture at 125° C. (initial temperature), and the mixture was homogenized. After the temperature (pouring temperature) of the reaction mass had reached 165° C., said mass was poured onto a plate preheated to 150° C.

The reaction mixture solidified within a few minutes and was thermally matured for 24 hours at 100° C. to complete the reaction and then granulated and compounded.

Component B/2 was prepared similarly to Example 1, but at the following temperatures:
initial temperature: 120° C.
pouring temperature: 160° C.

Component B/3 was prepared similarly to Example 1, but at the following temperatures:
initial temperature: 110° C.
pouring temperature: 155° C.

Component B/4 was prepared similarly to Example 1, but at the following temperatures:
initial temperature: 105° C.
pouring temperature: 150° C.

Component B/5 was prepared similarly to Example 1, but at the following temperatures:
initial temperature: 102° C.
pouring temperature: 148° C.

Component B/6
  was prepared similarly to Example 1, but at the following temperatures:
    initial temperature: 100° C.
    pouring temperature: 145° C.
Component B/1V
  was prepared similarly to Example 1, but at the following temperatures:
    initial temperature: 60° C.
    pouring temperature: 100° C.
Component B/2V
  was prepared similarly to Example 1, but at the following temperatures:
    initial temperature: 65° C.
    pouring temperature: 105° C.
Component B/3V
  was prepared similarly to Example 1, but at the following temperatures:
    initial temperature: 67° C.
    pouring temperature: 106° C.
Component B4V
  was prepared similarly to Example 1, but at the following temperatures:
    initial temperature: 70° C.
    pouring temperature: 110° C.
Component B/5V
  was prepared similarly to Example 1, but at the following temperatures:
    initial temperature: 75° C.
    pouring temperature: 115° C.
Component B/6V
  was prepared similarly to Example 1, but at the following temperatures:
    initial temperature: 85° C.
    pouring temperature: 125° C.

The properties of the novel and comparative components B/1 to B/6V are shown in Table 1 below.

MFR determination

The granules were heated for 15 hours at 80° C. and the MFR was then measured at 200° C. and under an applied weight of 21.6 kg (DIN 53735).

VN determination

The determination was carried out in a 1% strength solution of TPU granules in N-methylpyrrolidone/dibutylamine in a ratio of 99:1 at 25° C. according to ISO 1628Part 1.

Melting point

For this purpose, about 13 mg of TPU granules were weighed into an aluminum capsule (0.6 mm) and flushed with nitrogen for 5 minutes at room temperature (flow rate about 3 l/h). The granules were then dried for 10 minutes at 100° C. in this nitrogen atmosphere and the melting point was measured at a heating rate of 20° C./min from −100° C. to +250° C. (General V 4.1 C Du Pont 2000).

TABLE 1

| Component B | MFR [g/10 min] | VN [ml/g] | $T_m$ [°C.] |
|---|---|---|---|
| B1 | 25.0 | — | 165.5 |
| B2 | 22.0 | — | 168.2 |
| B3 | 21.0 | 200 | 179.9 |
| B4 | 35.0 | 131 | 186.6 |
| B5 | 30.0 | 129 | 189.6 |
| B6 | 35.0 | 125 | 189.8 |

TABLE 1-continued

| Component B | MFR [g/10 min] | VN [ml/g] | $T_m$ [°C.] |
|---|---|---|---|
| B/1V | 8.0 | 137 | 209.0 |
| B/2V | 19.0 | 145 | 207.0 |
| B/3V | 15.0 | 460 | 207.2 |
| B/4V | 14.0 | 156 | 208.4 |
| B/5V | 13.0 | — | 206.9 |
| B/6V | 17.0 | — | 200.6 |

Preparation of the POM/TPU molding materials

Component A)

Polyoxymethylene copolymer comprising 97.3% by weight of trioxane and 2.7% by weight of butanediol formal. The product also contained about 3% by weight of unconverted trioxane and 5% by weight of thermally unstable components. After degradation of the thermally unstable components, the copolymer had a melt flow index of 9 g/10 min (190° C., 2.16 kg applied weight according to ISO 1133).

The component A) was introduced into a twin-screw extruder (ZSK 30 from Werner & Pfleiderer) and 20% by weight each of components B/1 to B6V were metered in at 230° C. by means of a side extruder, and the mixture was homogenized and devolatilized, and the homogenized mixture was extruded and granulated.

To test the formation of mold coatings, injection molded specimens (dimensions: solidification cross, flow distance 100 mm, thickness 1.5 mm, width of an arm of the cross 30 mm) were produced at T=200° C.

After 120 cycles, the coating on the injection mold was assessed visually. The results are shown in Table 2.

TABLE 2

| Example | Component A [% by wt.] | Component B [% by wt.] | Coating on mold |
|---|---|---|---|
| 1 | 80 | 20 B/1 | no coating on mold |
| 2 | 80 | 20 B/2 | no coating on mold |
| 3 | 80 | 20 B/3 | no coating on mold |
| 4 | 80 | 20 B/4 | no coating on mold |
| 5 | 80 | 20 B/5 | no coating on mold |
| 6 | 80 | 20 B/6 | no coating on mold |
| 7*) | 80 | 20 B/1V | very pronounced coating on mold |
| 8*) | 80 | 20 B/2V | very pronounced coating on mold |
| 9*) | 80 | 20 B/3V | very pronounced coating on mold |
| 10*) | 80 | 20 B/4V | very pronounced coating on mold |
| 11*) | 80 | 20 B/5V | pronounced coating on mold |
| 12*) | 80 | 20 B/6V | moderate coating on mold |

*)for comparison

We claim:

1. A thermoplastic molding material containing
   A) from 15 to 99% by weight of a polyoxymethylene homo- or copolymer and
   B) from 1 to 60% by weight of a thermoplastic polyurethane having a melting point of <200° C. and
   C) from 0 to 50% by weight of a fibrous or particulate filler or a mixture thereof and D) from 0 to 30% by weight of additives and processing assistants selected from the group consisting of formaldehyde scavengers, plasticizers, lubricants, antioxidants, adhesion promoters, light stabilizers and pigments, the percentage by weight of the components A) to D) summing to 100%, wherein the thermoplastic polyurethane B) is obtained by reacting a) organic diisocyanates, b) polyhydroxy compounds having number average ($M_n$) molecular weights of from 500 to 8000 and chain extenders having number average ($M_n$) molecular weights of from 60 to 400, in the presence of d) catalysts and e) assistants and/or additives at an initial temperature of $\geqq 100°$ C. and a pouring temperature of from 140° to 200° C. and with subsequent thermal maturing at a temperature of from 60° to 120° C.

2. A thermoplastic molding material as defined in claim 1, in which the component B) has a melting point of <195° C.

* * * * *